(12) United States Patent
Schneiderbanger et al.

(10) Patent No.: US 12,545,202 B2
(45) Date of Patent: Feb. 10, 2026

(54) DRIVE UNIT WITH PRE-ASSEMBLED CABLE MODULE

(71) Applicant: Brose Fahrzeugteile SE & Co. Kommanditgesellschaft, Bamberg, Bamberg (DE)

(72) Inventors: Michael Schneiderbanger, Rattelsdorf (DE); Detlev Mathes, Itzgrund (DE); Andreas Buehner, Bamberg (DE); Frank Haelbig, Bamberg (DE)

(73) Assignee: Brose Fahrzeugtelle SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/729,818

(22) PCT Filed: Jan. 16, 2023

(86) PCT No.: PCT/EP2023/050821
§ 371 (c)(1),
(2) Date: Jul. 17, 2024

(87) PCT Pub. No.: WO2023/135281
PCT Pub. Date: Jul. 20, 2023

(65) Prior Publication Data
US 2025/0115199 A1      Apr. 10, 2025

(30) Foreign Application Priority Data
Jan. 17, 2022   (DE) ..................... 10 2022 101 005.8

(51) Int. Cl.
*B60R 16/03*   (2006.01)
*B60R 16/02*   (2006.01)
(Continued)

(52) U.S. Cl.
CPC .......... *B60R 16/03* (2013.01); *B60R 16/0215* (2013.01); *E05F 15/622* (2015.01);
(Continued)

(58) Field of Classification Search
CPC .... B60R 16/0215; B60R 16/03; E05F 15/622; E05Y 2201/636; E05Y 2400/40;
(Continued)

(56) References Cited

U.S. PATENT DOCUMENTS 10,738,526 B2 *  8/2020  Ishikawa .................. H02K 5/10
11,480,004 B2 * 10/2022  Kummer ................ E05F 15/622
(Continued)

FOREIGN PATENT DOCUMENTS

CN            111441687  W      7/2020
CN            212518660  W      2/2021
(Continued)

OTHER PUBLICATIONS

"German Search Report," for Application Serial No. 102022101005. 8, dated Jan. 17, 2022, 7 pages.
(Continued)

*Primary Examiner* — Minnah L Seoh
*Assistant Examiner* — Gregory T Prather
(74) *Attorney, Agent, or Firm* — Pauly, DeVries Smith & Deffner LLC

(57) ABSTRACT

A drive unit for a drive for adjusting an adjusting element of a motor vehicle along a geometric drive axis, wherein the drive unit has a dynamic unit having a drive motor, a cable module having a motor circuit board as well as a drive unit housing for receiving at least the drive motor and the cable module, wherein the cable module for fixing the motor circuit board has a circuit board holder and a cable module cover, into which one or multiple cables for electrical connection to the drive motor and/or the motor circuit board
(Continued)

are routed, and a first drive connection which is connected to the cable module cover, and a geometric cable module axis, wherein the dynamic unit is connected to the cable module in an axially fixed manner. It is proposed that the cable module can be designed as a pre-assembled functional unit.

15 Claims, 5 Drawing Sheets

(51) Int. Cl.
*E05F 15/622* (2015.01)
*F16H 25/20* (2006.01)
(52) U.S. Cl.
CPC ..... *E05Y 2600/56* (2013.01); *E05Y 2900/546* (2013.01); *F16H 25/20* (2013.01)
(58) Field of Classification Search
CPC ........... E05Y 2400/654; E05Y 2600/56; E05Y 2600/60; E05Y 2800/205; E05Y 2800/268; E05Y 2800/422; E05Y 2800/684; E05Y 2800/696; E05Y 2800/742; E05Y 2900/546; F16H 25/20; H02K 11/33; H02K 2211/03; H02K 5/225; H02K 5/24; H02K 7/06
See application file for complete search history.

(56) References Cited

U.S. PATENT DOCUMENTS

2017/0302132 A1* 10/2017 Münz ..................... H01R 43/24
2018/0317282 A1* 11/2018 Rogers ..................... H05B 3/84
2020/0181967 A1* 6/2020 Schweizer ............ E05F 15/622

FOREIGN PATENT DOCUMENTS

| DE | 102019130651 W | 5/2021 |
| WO | 2022112107 | 6/2022 |
| WO | 2023135281 | 7/2023 |

OTHER PUBLICATIONS

"PCT International Search Report," from related matter PCT/EP2023/050821, dated Apr. 18, 2023, 10 pages.

* cited by examiner

DRIVE UNIT WITH PRE-ASSEMBLED CABLE MODULE

CROSS-REFERENCE TO RELATED APPLICATIONS

This application is a national stage application under 35 U.S.C. 371 of International Patent Application Serial No. PCT/EP2023/050821, entitled "Drive Unit," filed Jan. 16, 2023, which claims priority from German Patent Application No. DE 10 2022 101 005.8, filed Jan. 17, 2022, the disclosure of which is incorporated herein by reference.

FIELD OF THE TECHNOLOGY

Various embodiments relate to a drive unit for a drive for adjusting an adjusting element of a motor vehicle, a drive for adjusting an adjusting element of a motor vehicle and a method for producing a drive unit.

BACKGROUND

The known drive (DE 10 2019 130 651 A1), on which some embodiments are based, is configured as a spindle drive for adjusting a tailgate of a motor vehicle. The drive has a drive unit having a dynamic unit and a cable module and a feed gear which is in the form of a spindle-spindle nut gear and is coupled in terms of drive technology to the drive unit. The dynamic unit has a drive motor, a downstream reduction gear and possibly an additional component, such as a braking device, in a tubular drive unit housing. The drive components are then pushed into the drive unit housing until one of these drive components comes into axial engagement with a retaining element, as a result of which the dynamic unit is formed. Following on, at least one cable is connected to the drive motor and/or a cable is connected to the motor circuit board in order to electrically connect this drive motor to the vehicle electrical system of the motor vehicle and/or a motor circuit board. Subsequently, a circuit board holder together with the motor circuit board is pushed onto the drive motor. Finally, a cable module cover of the cable module is placed on the drive unit housing and the cable module cover is connected to the drive unit housing, as a result of which the dynamic unit is connected to the cable module. The drive components are then held in the drive unit housing in an axially fixed manner between the retaining element and the cable module cover. The cable module cover then lies axially against the circuit board holder which in turn lies against the drive motor. In order to dampen a transmission of vibrations from the drive motor or the circuit board holder to the cable module cover, the circuit board holder is designed in three parts, wherein a lower circuit board part and an upper circuit board part are each designed as a hard component and a connecting part made of a soft component is arranged in the axial direction between the two circuit board holder parts.

This is a particularly compact design of a drive for adjusting an adjusting element of a motor vehicle. One challenge, however, is that the electrical contacting of the drive motor is complex due to the manual connection to one or multiple cables. At the same time, the design of the three-part circuit board holder is complex.

SUMMARY

The term "adjusting element" is to be understood broadly in the present case. It includes, for example, flaps such as tailgates, boot lids, bonnets, side doors, load compartment flaps, sliding doors or the like of a motor vehicle.

Various embodiments are based on the problem of designing and further developing the known drive unit in such a manner that it can be installed as simply as possible with good acoustic damping between the drive motor and the cable module cover.

The above problem is solved in the case of a drive unit having various features described herein.

In various embodiments, the basic idea is to pre-assemble the cable module first. Such a pre-assembled functional unit can then be transported and handled in a particularly simple manner. At the same time, assembly of the drive unit is simplified, since the individual components of the cable module are already fixed together as a unit. Essentially, the basic idea is also that the circuit board holder and the cable module cover are initially connected to each other in an axially fixed and, in particular, rotationally fixed manner. In this assembly state, the pre-assembled cable module can be brought together with the dynamic unit in a simple manner during the assembly of the drive unit by an assembly movement. The assembly movement decouples the cable module cover from the circuit board holder, i.e. the cable module cover and circuit board holder are no longer in contact with each other, so that this assembly simultaneously achieves acoustic decoupling between the cable module cover and the circuit board holder. In this manner, the pre-assembled functional unit of the cable module can be brought together with the dynamic unit in a simple manner, while at the same time acoustic decoupling is achieved between the cable module cover and the circuit board holder.

In detail, it is generally proposed that the cable module is designed as a pre-assembled functional unit, that the pre-assembled cable module can be brought together with the dynamic unit by an assembly movement during assembly of the drive unit, that by the assembly movement the cable module can be brought from an assembled state, in which the cable module cover is connected to the circuit board holder in an axially fixed and in particular rotationally fixed manner, into a decoupling state, in which the cable module cover is decoupled from the circuit board holder.

According to various embodiments, the assembly movement also electrically connects the drive motor to the motor circuit board and/or to one or multiple cables. Thus, the assembly movement advantageously brings about a further function, namely the electrical contacting of the drive motor with the cable module. On the one hand, it is possible for the electrical connection of the drive motor to overlap in time with the decoupling between the cable module cover and the circuit board holder, whereby a short length of the assembly movement to be performed can be achieved. Alternatively, it is also possible that the electrical connection of the drive motor takes place initially in a first section of the assembly movement and then the decoupling between the cable module cover and the circuit board holder takes place in a second section of the assembly movement.

In various embodiments, the drive unit housing is connected in the assembled state in an axially fixed manner to the cable module cover by means of a force-fit, material-bonded and/or form-fit connection and thus in a particularly simple manner. During the assembly movement, the cable module cover can be pushed at least in sections axially into the drive unit housing or pushed axially onto the drive unit housing, whereby a simple-to-perform assembly movement is realized that is at least in sections purely linearly oriented. In addition or alternatively, the assembly movement or a section of the assembly movement can also have a radial and/or a tangential component in addition to an axial component.

According to various embodiments, the electrical connection between the cable module and the drive motor can be established in a simple manner by electrically connecting an electrical connection plug of the cable module to a corresponding connection part of the drive motor by bringing the functional unit cable module together with the dynamic unit.

In some embodiments, an advantageous decoupling between the cable module cover and the circuit board holder is provided, in that the circuit board holder in the assembled state lies in one axial direction against the drive motor and in the other axial direction against the cable module cover via a damping element.

According to various embodiments, the circuit board holder can be connected to the cable module cover in an advantageously axially fixed and rotationally fixed manner during a pre-assembly of the cable module, whereby a simple pre-assembly of the cable module is realized. Alternatively, it is conceivable in an advantageous manner that the cable module cover and the circuit board holder are formed in one piece with each other in the assembly state and in particular have a predetermined breaking point.

Various embodiment define values for the force required to perform the assembly movement.

According to various embodiments, the force to be applied, i.e. the force required to perform the assembly movement during the first section is less than during or at least at the beginning of the second section of the assembly movement. In this manner, it can be ensured that the decoupling between the circuit board holder and the cable module only takes place after the electrical connection of the drive motor, whereby the assembly is kept simple and can be carried out particularly safely.

According to various embodiments, the circuit board holder has a strain relief for the cables of the cable module. The functional density is thus increased in an advantageous manner. It is then not necessary to provide a strain relief outside the drive unit.

According to various embodiments, a drive for adjusting an adjusting element of a motor vehicle is provided, wherein the drive has a drive unit according to the proposal, wherein the drive has a feed gear, in particular a spindle-spindle nut gear, coupled to the drive unit in terms of drive technology, for generating drive movements along a geometric drive axis between a first drive connection and a second drive connection. Reference may be made in this respect to all explanations of the drive unit according to the proposal.

According to various embodiments, a method for assembling a drive unit for a drive, in particular a spindle drive, for adjusting an adjusting element of a motor vehicle along a geometric drive axis, in particular a drive unit according to the proposal, is provided, wherein in the assembled state the drive unit has a dynamic unit having a drive motor, a cable module having a motor circuit board, which is electrically connected to the drive motor, as well as a drive unit housing for receiving at least the drive motor and the cable module, wherein the cable module for fixing the motor circuit board has a circuit board holder and a cable module cover, into which one or multiple cables for electrical connection to the drive motor and/or the motor circuit board are routed, and a first drive connection, which is connected to the cable module cover, and a geometric cable module axis, wherein the dynamic unit is connected to the cable module in an axially fixed manner. Reference may be made in this respect to all explanations of the drive unit according to the proposal and the drive according to the proposal.

In detail, it is generally proposed that the cable module is pre-assembled as a functional unit, that in the pre-assembled state of the cable module, the cable module cover is connected to a circuit board holder in an axially fixed and, in particular, rotationally fixed manner, that the pre-assembled cable module is brought together with the dynamic unit by an assembly movement and, in particular as a result of this, the drive motor is electrically connected to the motor circuit board and/or one or multiple cables and the cable module cover is decoupled from the circuit board holder.

Various embodiments provide a drive unit for a drive, in particular a spindle drive, for adjusting an adjusting element of a motor vehicle along a geometric drive axis, wherein the drive unit has a dynamic unit having a drive motor, a cable module having a motor circuit board, as well as a drive unit housing for receiving at least the drive motor and the cable module, wherein the cable module for fixing the motor circuit board has a circuit board holder and a cable module cover, into which one or multiple cables for electrical connection to the drive motor and/or the motor circuit board are routed, and a first drive connection, which is connected to the cable module cover, and a geometric cable module axis, wherein the dynamic unit is connected to the cable module in an axially fixed manner, wherein, the cable module is designed as a pre-assembled functional unit, the pre-assembled cable module can be brought together with the dynamic unit by an assembly movement during assembly of the drive unit, by the assembly movement the cable module can be brought from an assembly state, in which the cable module cover is connected to the circuit board holder in an axially fixed and in particular rotationally fixed manner, into a decoupling state, in which the cable module cover is decoupled from the circuit board holder.

In various embodiments, during the assembly of the drive unit, in addition to the decoupling between the cable module cover and the circuit board holder, the assembly movement electrically connects the drive motor to the motor circuit board and/or to one or multiple cables.

In various embodiments, the electrical connection of the drive motor to the motor circuit board and/or to one or multiple cables essentially overlaps in time with the decoupling between the cable module cover and the circuit board holder.

In various embodiments, the assembly movement in a first section of the assembly movement electrically connects the drive motor to the motor circuit board and/or to the one or the multiple cables and wherein decoupling between the cable module cover and the circuit board holder takes places in a second section of the assembly movement following the first section.

In various embodiments, the cable module cover is connected to the drive unit housing in an axially fixed and, in particular, rotationally fixed manner in the assembled state of the drive unit by means of a force-fit, material-bonded and/or form-fit connection, wherein the cable module cover can be pushed at least in sections axially into the drive unit housing or can be pushed axially onto the drive unit housing and/or the assembly movement or a section of the assembly movement has a radial and/or a tangential component in addition to an axial component.

In various embodiments, the cable module has at least one electrical connection plug, which is electrically connected to at least one cable of the cable module, and wherein the bringing together of the cable module cover with the dynamic unit brings about an electrical connection between the electrical connection plug and a corresponding connection part of the drive motor.

In various embodiments, the circuit board holder lies against the drive motor in one axial direction and against the cable module cover in the other axial direction via a damping element in the assembled state of the drive unit.

In various embodiments, the cable module cover can be brought together with the circuit board holder during pre-assembly of the cable module and, in particular as a result of this, can be connected in an axially fixed and rotationally fixed manner.

In various embodiments, in the assembly state the cable module cover and the circuit board holder are designed in one piece with each other, in particular have a predetermined breaking point, such as wherein the cable module cover and the circuit board holder are separated at the predetermined breaking point in the decoupling state.

In various embodiments, the force to be applied to perform the assembly movement is 30 N to 200 N, 50 N to 150 N, or 70 N to 100 N.

In various embodiments, the force to be applied to perform the assembly movement during the first section is less than during or at the beginning of the second section of the assembly movement.

In various embodiments, the circuit board holder has a fixing element for fixing the one or multiple cables relative to the circuit board holder, whereby strain relief of the one or multiple cables is realized.

Various embodiments provide a drive, in particular a spindle drive, for adjusting an adjusting element of a motor vehicle, wherein the drive has a drive unit as provided herein, wherein the drive has a feed gear, in particular a spindle-spindle nut gear, coupled to the drive unit in terms of drive technology, for generating drive movements along a geometric drive axis between a first drive connection and a second drive connection.

Various embodiments provide a method for assembling a drive unit for a drive, in particular a spindle drive, for adjusting an adjusting element of a motor vehicle along a geometric drive axis, in particular of a drive as provided herein, wherein in the assembled state the drive unit has a dynamic unit having a drive motor, a cable module having a motor circuit board as well as a drive unit housing for receiving at least the drive motor and the cable module, wherein the cable module for fixing the motor circuit board has a circuit board holder and a cable module cover, into which one or multiple cables for electrical connection to the drive motor and/or the motor circuit board are routed, and a first drive connection which is connected to the cable module cover and a geometric cable module axis, wherein the dynamic unit is connected to the cable module in an axially fixed manner, wherein the cable module is pre-assembled as a functional unit, in the pre-assembled state of the cable module the cable module cover is connected to a circuit board holder in an axially fixed and, in particular, rotationally fixed manner, the pre-assembled cable module is brought together with the dynamic unit by an assembly movement and, in particular as a result of this, the drive motor is electrically connected to the motor circuit board and/or to the one or the multiple cables and the cable module cover is decoupled from the circuit board holder.

BRIEF DESCRIPTION OF THE DRAWINGS

In the following, various aspects are explained in more detail with the aid of a drawing which merely illustrates exemplary embodiments. In the drawing.

DETAILED DESCRIPTION

The drive unit 1 shown in the figures is part of a drive 2, in this case a spindle drive, for adjusting an adjusting element 3 of a motor vehicle. The adjusting element 3 in this case can be a tailgate. All explanations relating to a tailgate also apply in the present case to all other types of adjusting elements 3 of a motor vehicle. In this respect, reference may be made to the exemplary list in the introductory part of the description.

Figure 1:
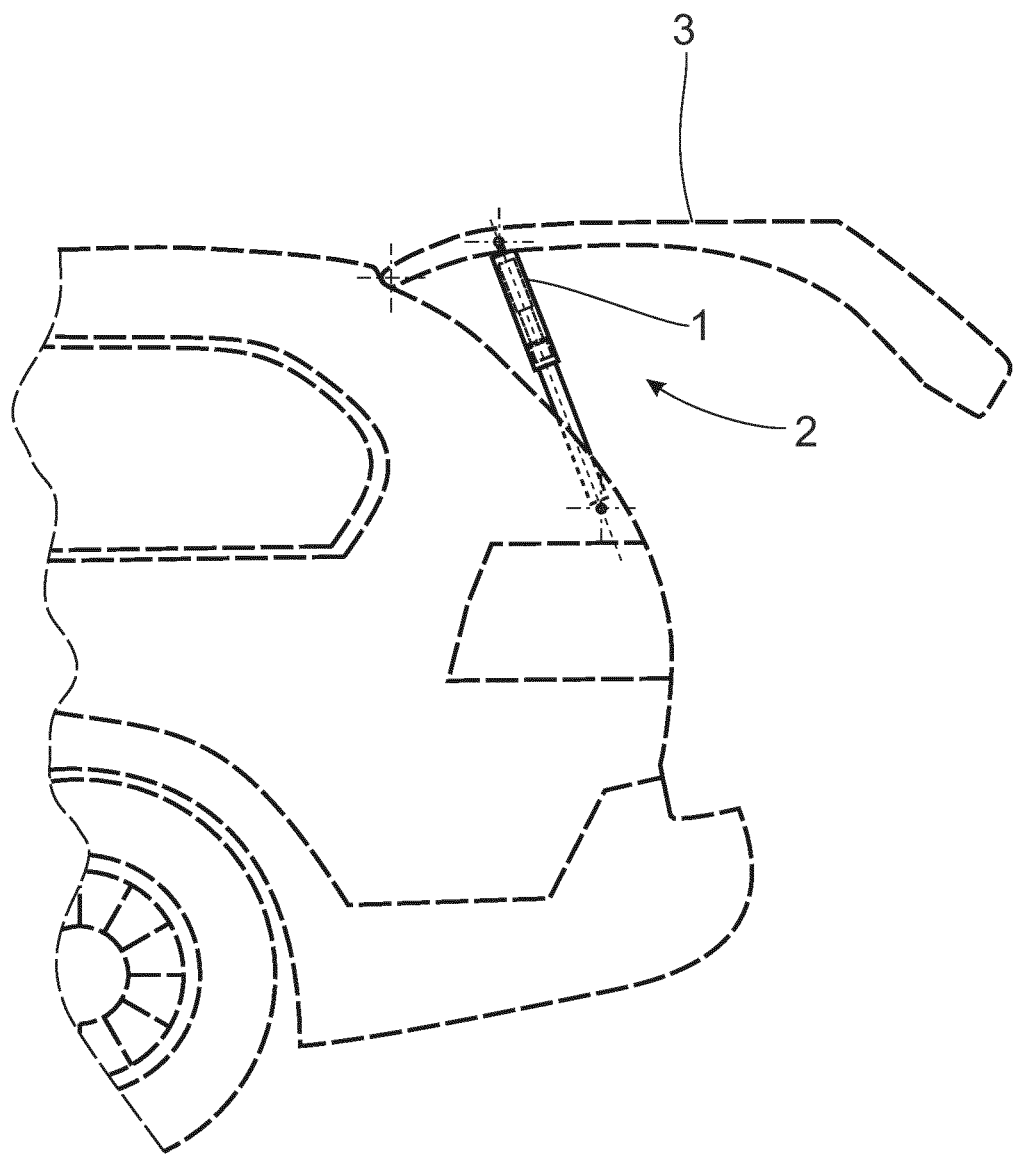
FIG. 1 shows the rear section of a motor vehicle having a drive according to the proposal, which has a drive unit according to the proposal.

The drive 2 is used to adjust the tailgate. For this purpose, the drive 2 is articulated to the vehicle body on the one hand and to the adjusting element 3 on the other. In various embodiments, the drive 2 generates linear drive movements along a geometric drive axis A, so that the adjusting element 3 can be adjusted between a closed position and the open position shown in FIG. 1. This adjustment takes place by means of a dynamic unit 4 having an electric drive motor 5, which generates a drive force that causes the adjustment of the adjusting element 3.

Figure 2:
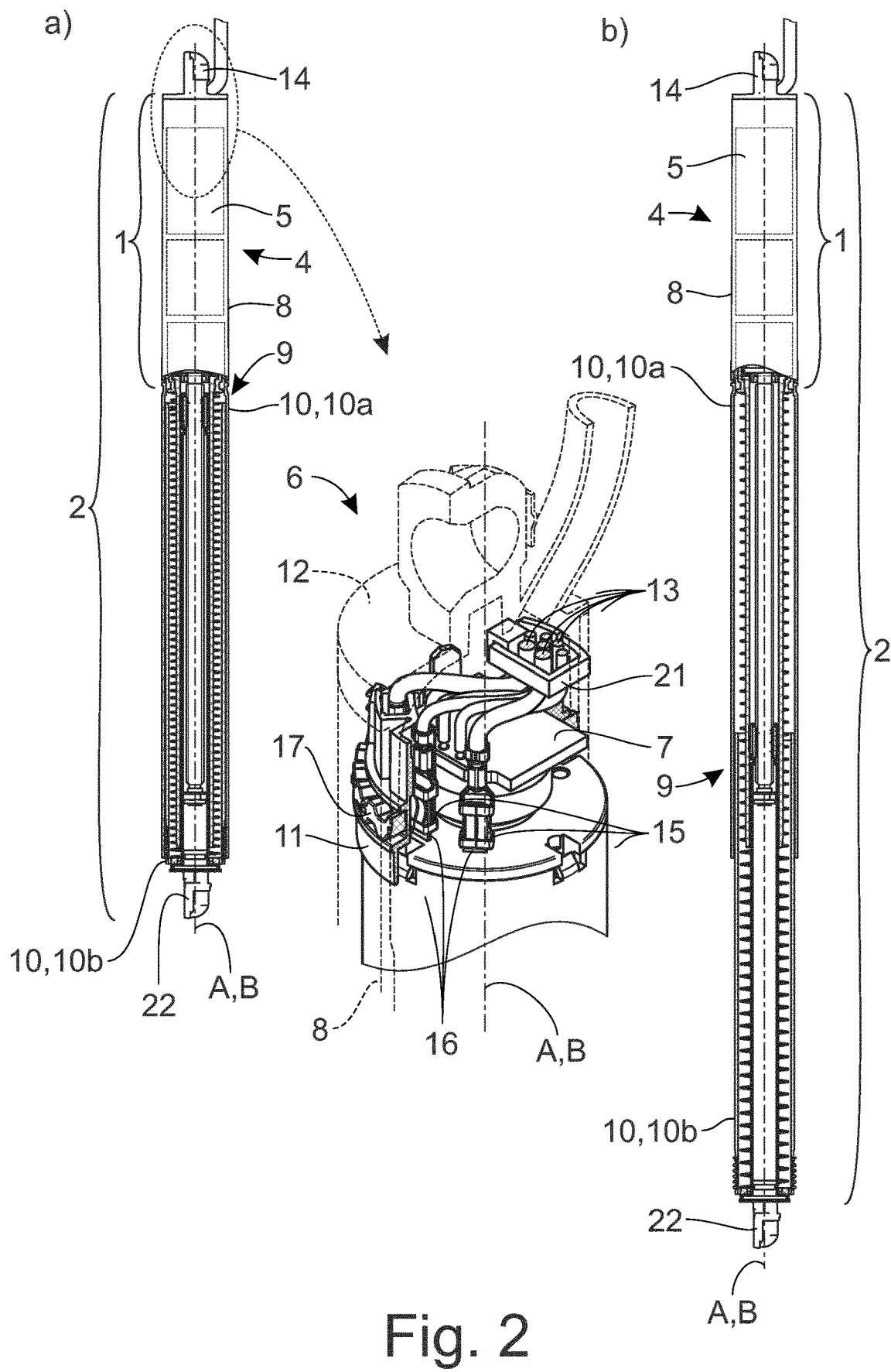
FIG. 2 shows the drive according to FIG. 1 with an example embodiment of a drive unit in its a) retracted position and b) extended position.

Furthermore, as shown in the views in FIG. 2, the drive unit 1 has a cable module 6 having a motor circuit board 7. The motor circuit board 7 can be electrically connected directly to the drive motor 5 or electrically connected to the drive motor 5 via a motor control unit, which is not shown. The drive motor 5 of the drive unit 1 is arranged in a drive unit housing 8, which is shown not cut open in the upper section of the drive 2 in FIGS. 2a) and b). The drive unit housing 8 of the drive unit 1 is also used in this case for at least in part receiving the cable module 6.

The term "motor circuit board" is to be understood broadly in the present case. It includes both circuit boards made of single layers and also circuit boards made of multilayers. It also includes rigid, flexible and rigid-flexible circuit boards. Such a circuit board can also be designed as a film conductor. A motor circuit board in the above sense regularly has conductor tracks and electrical and/or electronic components. Moreover, the components can, for example, be soldered, glued, molded or similar onto the circuit board. Such a motor circuit board 7 can be used to control the drive motor 5 and/or other components of the drive unit 1 and/or the drive 2.

Here, the drive unit 1 has in terms of drive technology downstream of the drive motor 5, also one or multiple further drive unit components such as an intermediate gear, for example a planetary gear, a brake, a clutch or the like, wherein these drive unit components can each also be arranged together with the drive motor 5 in the drive unit housing 8.

Furthermore, a feed gear 9 is connected downstream of the drive unit 1 in terms of drive technology. The feed gear 9 is arranged in an outer housing 10 of the drive unit 2. Here, the outer housing 10 is telescopic and, in particular, tubular in design. For this purpose, the outer housing 10 has an outer, in particular tubular, housing part 10a and an inner, in particular tubular, housing part 10b, as FIG. 2b) shows by way of example. In this context, the term "telescopic" means that the outer housing part 10a and the inner housing part 10b are displaceable relative to each other in the axial direction, wherein the inner outer housing part 10b is guided in the outer outer housing part 10a. In various embodiments, the outer housing 10 is connected to the drive unit housing 8 in the axial direction and in the circumferential direction around the geometric drive axis A. In the present case, "connected" is to be understood as a material-bonded, force-fit and/or form-fit connection. In this case, "axial" refers to the direction of the geometric drive axis A.

The cable module 6 has a circuit board holder 11 for fixing the motor circuit board 7. The circuit board holder 11 can also be used to fix the motor circuit board 7 in relation to the cable module 6 on the one hand radially and on the other hand axially, in particular axially in both directions.

The cable module 6 has a cable module cover 12, into which one or multiple cables 13 are routed from outside the drive unit 1 for electrical connection to the drive motor 5 and/or the motor circuit board 7. The cable module 6 has a geometric cable module axis B, which is arranged coaxially to the geometric drive axis A in the assembled state of the drive unit 1 (FIG. 2).

Unless otherwise stated, the term "axial" in the present case always refers to the geometric cable module axis B. The same applies to the terms "radial" and "rotationally fixed".

The drive unit housing 8 is connected in an axially fixed manner to the cable module cover 12 when the drive unit 1 is in the assembled state (FIG. 2). In various embodiments, the drive unit housing 8 engages directly with the cable module cover 12.

In the assembled state, the circuit board holder 11 is arranged in an axial section of the drive unit housing 8, which lies axially between the drive motor 5 and a drive connection 14. The cable module cover 12 can be a component that closes the drive unit housing 8 axially to the first drive connection 14, in particular in a sealing manner.

It is essential now that the cable module 6 is designed as a pre-assembled functional unit, that the pre-assembled cable module 6 can be brought together with the dynamic unit 4 by an assembly movement during assembly of the drive unit 1, that by the assembly movement the cable module 6 can be brought from an assembly state, in which the cable module cover 12 is connected to the circuit board holder 11 in an axially fixed and in particular rotationally fixed manner, into a decoupling state, in which the cable module cover 12 is decoupled from the circuit board holder 11.

In this case, "pre-assembled" means that the individual components are already fixed together as a unit.

The term "functional unit" means that the pre-assembled unit has all the components required for the respective functionality. In the present case, the term "functional unit" in relation to the cable module 6 therefore means that it has all the components required to provide an electrical connection to the dynamic unit 4.

In the present case, the term "can be brought together" is to be understood independently of the direction in which the functional units are connected to each other. In particular, this means that the functional units can be plugged together axially. In various embodiments, the cable module 6 can be inserted axially into the dynamic unit 4 or pushed axially onto it, at least in sections.

In the present case, the term "decoupled" means that the cable module cover 12 and the circuit board holder 11 are not directly connected to each other and/or are not directly engaged with each other. Consequently, the cable module cover 12 and the circuit board holder 11 are not in direct engagement with each other in the decoupling state, so that direct transmission of oscillations and vibrations is not possible, which improves acoustic decoupling.

Due to its design as a separate functional unit, the cable module 6 can be pre-assembled independently of the dynamic unit 4, wherein the respective components of the cable module 6 are secured to each other without the need for a connection between the dynamic unit 4 and the cable module 6. In addition, the assembly of the drive unit 1 is simplified, since the dynamic unit 4 and the cable module 6 can be brought together in a simple manner.

As already explained, the assembly movement brings about decoupling between the circuit board holder 11 and the cable module cover 12, whereby assembly can be performed in a simple manner. Assembly can be further simplified if, during the assembly of the drive unit 1, the assembly movement electrically connects the drive motor 5 to the motor circuit board 7 and/or to one or multiple cables 13 and the decoupling between the motor circuit board holder 11 and the cable module cover 12. Consequently, the assembly movement fulfills two functions, namely on the one hand the electrical connection of the drive motor 5 to the motor circuit board 7 and/or one or multiple cables 13 and on the other hand also the decoupling between the circuit board holder 11 and the cable module cover 12. Here, the motor circuit board 7 is already electrically connected to at least one cable 13 in the pre-assembled state, so that the drive motor 5 is in any case electrically connected to at least one cable 13 during the assembly movement. In the figures, only the electrical connection between the drive motor 5 and at least one cable 13 and the electrical connection between the motor circuit board 7 and at least one cable 13 is shown. The drive motor 5 can then be electrically connected to the motor circuit board 7 via the motor control unit, which is not shown. However, it is also possible that, alternatively or additionally, a direct electrical connection between the drive motor 5 and the motor circuit board 7 is brought about by the assembly movement.

It is possible that the electrical connection of the drive motor 5 to the motor circuit board 7 and/or one or multiple cables 13 essentially overlaps in time with the decoupling between the circuit board holder 11 and the cable module cover 12. In order to divide the force to be applied for the two aforementioned functions, it is alternatively also possible for the drive motor 5 to be electrically connected to the motor circuit board 7 and/or one or multiple cables 13 in a first section of the assembly movement and for the decoupling between the board holder 11 and the cable module cover 12 to take place in a second section of the assembly movement following the first section. Only the force for the electrical connection of the drive motor 5 then needs to be applied during the first section of the assembly movement and the force for decoupling between the circuit board holder 11 and the cable module cover 12 needs to be applied during the second section.

It can be provided that the cable module cover 12 is connected to the drive unit housing 8 in an axially fixed and, in particular, rotationally fixed manner in the assembled state of the drive unit 1 by means of a force-fit, material-bonded and/or form-fit connection. In various embodiments, the cable module cover 12 can also be pushed axially into the drive unit housing 8 or axially onto the drive unit housing 8 at least in sections during the assembly movement. By "axially at least in sections" is meant that the assembly movement is directed purely axially over at least one section of the assembly movement or over the entire assembly movement. In this manner, the assembly movement can be carried out in a particularly simple manner. The assembly movement or a section of the assembly movement can also, in addition or alternatively, have a radial and/or a tangential component in addition to an axial component, so that the assembly movement is, for example, a screwing movement at least in sections. However, it is particularly advantageous if the assembly movement takes place exclusively in the axial direction.

As the detailed view of FIG. 2*a*) shows, it can be provided that the circuit board holder 11 has at least one electrical connection plug 15, which is electrically connected to at least one cable 13 of the cable module 6, and that the bringing together of the cable module 6 with the dynamic unit 4 brings about an electrical connection between the electrical connection plug 15 and a corresponding connection part 16 of the drive motor 5. In this manner, sliding the cable module cover 12 into the drive unit housing 8 or sliding the cable module cover 12 onto the drive unit housing 8 causes the drive motor 5 to be electrically connected to the cable module 6 and, where appropriate, the motor circuit board 7. It is particularly advantageous if the circuit board holder 11 is coupled to the electrical connector 15 for electrical contacting of the drive motor 5 before the cable module cover 12 is pushed in or pushed on.

For mechanical decoupling, it can be provided that the circuit board holder 11 lies against the drive motor 5 in one axial direction and against the cable module cover 12 in the other axial direction via a damping element 17 in the assembled state of the drive unit 1, as shown in FIG. 2. The damping element 17 can be made of a plastic, in particular an elastomer. The selection of the material of the damping element 17 can be adapted to the desired damping between the circuit board holder 11 and the cable module cover 12.

In order to achieve good compression behavior of the damping element 17, in the embodiment shown in the figures, the damping element 17 is designed to be undulating in the circumferential direction around the geometric cable module axis B. In this manner, evenly distributed free spaces are created between the circuit board holder 11 and the damping element 17 as well as between the cable module cover 12 in the circumferential direction, and the material of the damping element 17 can be elastically pressed into the free spaces in the assembled state of the drive unit 1. In this manner, particularly uniform damping can be achieved in the circumferential direction between the cable module cover 12 and the circuit board holder 11.

Figure 3:
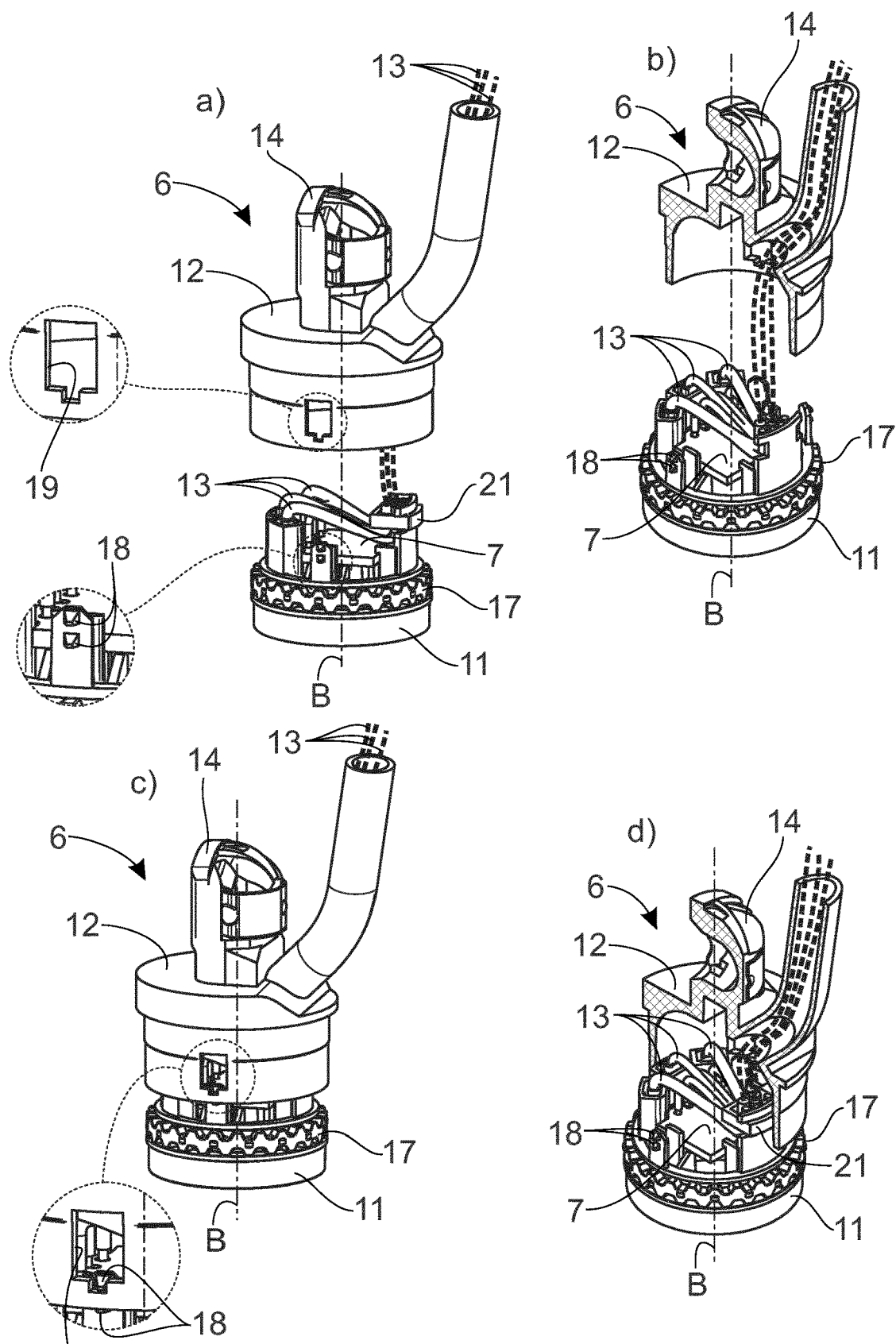
FIG. 3 shows a cable module of the drive unit according to FIG. 2 in a) a non-pre-assembled state, in which the cable module cover and the circuit board holder are not connected, b) a partially sectioned view of the cable module cover and circuit board holder in the non-pre-assembled state, c) an assembly state, in which the cable module cover and the circuit board holder are connected to each other in an axially fixed manner, and d) a partially sectioned view in the assembly state.

The drive unit 1 can be assembled in a particularly simple manner if the cable module cover 12 can be brought together with the circuit board holder 11 during pre-assembly of the cable module 6 and, in particular as a result of this, can be connected in an axially fixed and, in particular, rotationally fixed manner. In the embodiment shown in FIG. 3, FIG. 4, FIG. 5*a*) and FIG. 5*b*), the cable module cover 12 can be connected to the circuit board holder 11 in an axially fixed manner by means of a snap-in connection. For this purpose, the circuit board holder 11 has at least two radially outwardly projecting latching projections 18, which are arranged one above the other in the axial direction, as FIG. 3*a*) shows. During pre-assembly, these latching projections 18 engage with a recess 19 in the cable module cover 12, as a result of which the circuit board holder 11 is connected to the cable module cover 12 in an axially fixed and, in particular, rotationally fixed manner, as shown in FIG. 3*c*). The cable module 6 is then pre-assembled as a functional unit and is in the assembly state. Alternatively or additionally, it is also possible to connect the circuit board holder 11 to the cable module cover 12 via a press fit during pre-assembly.

Figure 5:
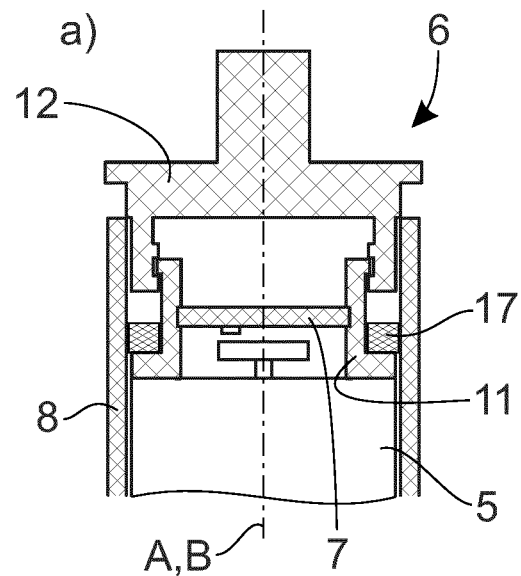
FIG. 5 shows in a schematic representation of the cable module in a) a first embodiment in the assembly state, b) the first embodiment in the decoupling state, c) a second embodiment in the assembly state and d) the second embodiment in the decoupling state.
Figure 5:
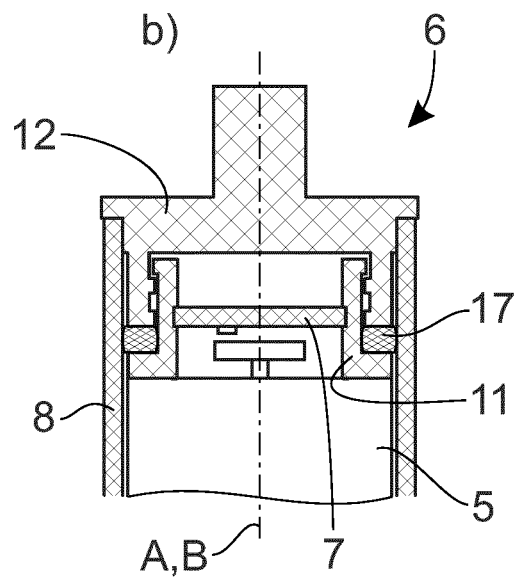
Figure 5:
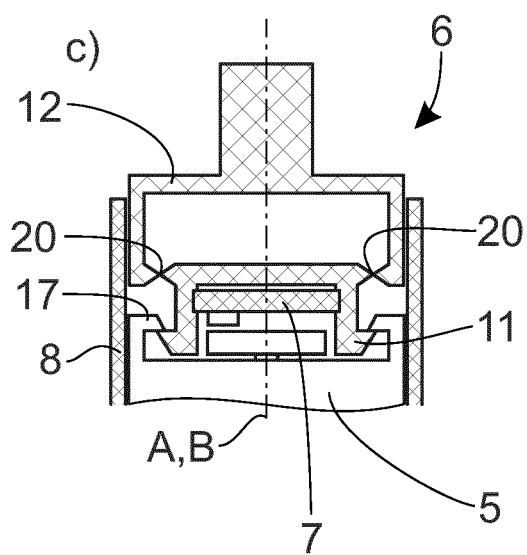
Figure 5:
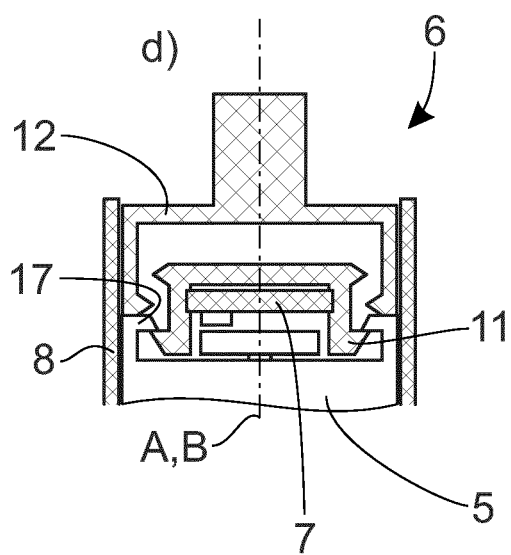

Alternatively, it is also possible for the cable module cover 12 and the circuit board holder 11 to be formed in one piece with each other in the assembly state, as shown in FIG. 5*c*). In this case, at least one predetermined breaking point 20 can be provided, which ensures a connection between the circuit board holder 11 and the cable module cover 12 in the assembly state and at the same time enables a transfer into the decoupling state, so that the cable module cover 12 and the circuit board holder 11 are separated at the predetermined breaking point in the decoupling state.

Figure 4:
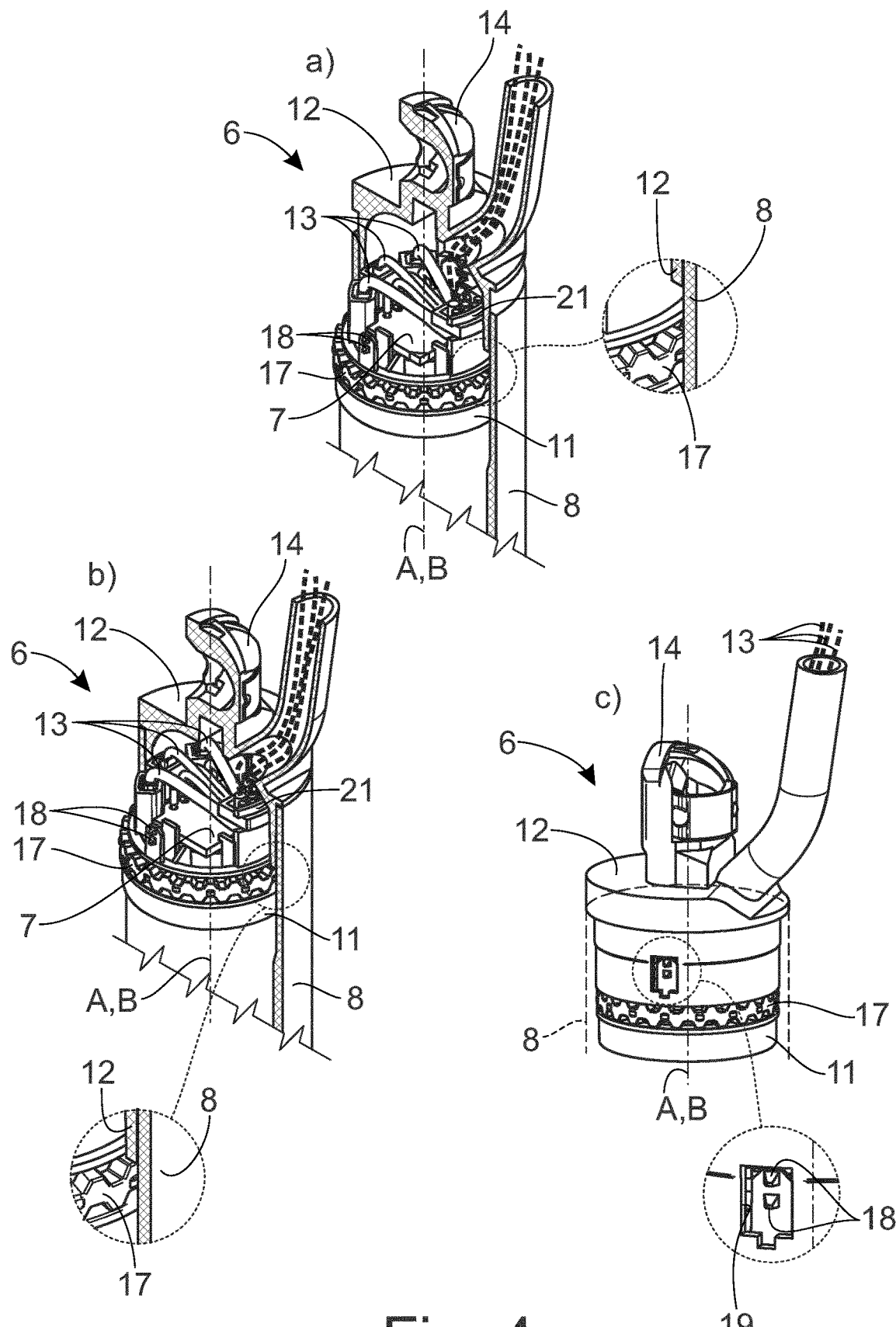
FIG. 4 shows the cable module of the drive unit according to FIG. 3 in a) a partially sectioned view in the assembly state, b) a partially sectioned view in a decoupling state, in which the cable module cover is decoupled from the circuit board holder and c) a perspective view in the assembly state

After pre-assembly of the cable module 6, the cable module 6 can be brought together with the dynamic unit 4. For this purpose, the cable module 6 is inserted at least in sections into the drive unit housing 8, in which the drive motor 5 is arranged, as shown in FIG. 4*a*), FIG. 5*a*) and FIG. 5*c*). The cable module 6 is initially in the assembly state. During the assembly movement, which can take place in this case in the axial direction, the drive motor 5 is electrically connected to at least one cable 13 on a first section of the assembly movement via the connection plug 15 and the corresponding connection part 16. This state is shown in FIG. 4*a*), FIG. 5*a*) and FIG. 5*c*). During the first section of the assembly movement, the cable module cover 12, in the embodiment shown in FIG. 3, FIG. 4, FIG. 5*a*) and FIG. 5*b*), is connected to the circuit board holder 11 in an axially fixed and, in particular, rotationally fixed manner via the recess 19 and the latching projections 18. In the embodiment shown in FIG. 5*c*) and FIG. 5*d*), the cable module cover 12 and the circuit board holder 11 are formed in one piece with each other.

The cable module cover 12 is moved further in the axial direction during the second section of the assembly movement until it engages with the damping element 17 in the axial direction, as a result of which the drive motor 5 is held axially fixed in the direction of the drive connection 14. The damping element 17 can be compressed in the axial direction in order to achieve a preload. During the second section of the assembly movement, the connection between the circuit board holder 11 and the cable module cover 12 is released, as shown in the transition from FIG. 3*c*) to FIG. 4*c*), from FIG. 5*a*) to FIG. 5*b*) and from FIG. 5*c*) to FIG. 5*d*). In the embodiment shown in FIG. 4*c*), both latching projections 18 are arranged inside the recess 19 in such a manner that there is no engagement between the latching projections 18 and the recess 19. The circuit board holder 11 is then only in indirect engagement with the cable module cover 12 via the damping element 17, whereby good acoustic damping is achieved. In this manner, the circuit board holder 11 is decoupled from the cable module cover 12.

Thus, only the cable module cover 12 must be inserted at least in sections into the drive unit housing 8 or guided in sections onto the drive unit housing 8 during assembly in order to obtain an electrical connection of the drive motor 5 to at least one cable 13 and/or the motor circuit board 7 and to decouple the circuit board holder 11 from the cable module cover 12. The cable module cover 12 can be connected to the drive unit housing 8 in an axially fixed and rotationally fixed manner during the assembly movement, in particular in a form-fit and/or force-fit manner. For example, a latching connection can be provided between the drive unit housing 8 and the cable module cover 12. Alternatively or additionally, a material-bonded connection, in particular an adhesive connection and/or a welded connection, can be provided.

In the embodiment shown in FIG. 5c) and FIG. 5d), the damping element 17 is connected to the housing of the drive motor 5. In the present case, the term "connected" is to be understood as a material-bonded, force-fit and/or form-fit connection, which in particular also includes a one-piece design of the housing of the drive motor 5 with the damping element 17. The damping element 17 is designed as a latching connection hook, which is latched by a corresponding mating hook of the circuit board holder 11 during the assembly movement, whereby the circuit board holder 11 is held axially fixed to the drive motor 5.

As already explained, the cable module 6 can be manually transferred in a simple manner into the decoupling state. The force required or the force to be applied to perform the assembly movement can be advantageously 30 N to 200 N, 50 N to 150 N, or 70 N to 100 N.

It is particularly advantageous if the force to be applied in order to perform the assembly movement during the first section is less than during or at least at the beginning of the second section of the assembly movement. It is then ensured that the connection between the circuit board holder 11 and the cable module cover 12 is only released when the drive motor 5 is electrically connected to the motor circuit board 7 and/or one or multiple cables 13. At the same time, when the connection between the circuit board holder 11 and the cable module cover 12 is disconnected, the user receives confirmation that the drive motor 5 has been electrically connected due to the drop in force.

In the embodiment shown in FIG. 2 to FIG. 4, the circuit board holder 11 has a fixing element 21 for fixing the one or multiple cables 13 relative to the circuit board holder 11, whereby strain relief of the one or multiple cables 13 is realized. If there is a tensile load along the cables 13 from outside the cable module 6, the tensile forces are absorbed by the fixing element 21. In this manner, it is possible to prevent the electrical connection between the one or multiple cables 13 and the motor board 7 and/or the drive motor 5 from being disconnected. The safety of the drive unit 1 can thus be improved in a simple manner.

According to a further teaching, a drive 2, in particular a spindle drive, for adjusting an adjusting element 3 of a motor vehicle is proposed, wherein the drive 2 has a drive unit 1 according to the proposal, wherein the drive 2 has a feed gear 9, in particular a spindle-spindle nut gear, coupled to the drive unit 1 in terms of drive technology, for generating drive movements along a geometric drive axis A between a first drive connection 14 and a second drive connection 22. Reference may be made in this respect to all explanations of the spindle drive 1.

According to a further teaching, a method is proposed for assembling a drive unit 1 for a drive 2, in particular a spindle drive, for adjusting an adjusting element 3 of a motor vehicle, in particular a spindle drive 1 according to the proposal, wherein in the assembled state the drive unit 1 has a dynamic unit 4 having a drive motor 5, a cable module 6 having a motor circuit board 7 as well as a drive unit housing 8 for receiving at least the drive motor 5 and the cable module 6, wherein the cable module 6 for fixing the motor circuit board 7 has a circuit board holder 11 and a cable module cover 12, into which one or multiple cables 13 for electrical connection to the drive motor 5 and/or the motor circuit board 7 are routed, and a first drive connection 14 which is connected to the cable module cover 12, wherein the dynamic unit 4 is connected to the cable module 6 in an axially fixed manner. Reference may be made in this respect to all explanations of the drive unit 1 according to the proposal.

It is essential now that the dynamic unit 4 and the cable module 6 are each pre-assembled as a functional unit, that in the pre-assembled state of the cable module 6, the cable module cover 12 is connected to a circuit board holder 11 in an axially fixed and, in particular, rotationally fixed manner, that the pre-assembled cable module 6 is brought together with the pre-assembled dynamic unit 4 by an assembly movement and, in particular as a result of this, the drive motor 5 is electrically connected to the motor circuit board 7 and/or one or multiple cables 13 and the cable module cover 12 is decoupled from the circuit board holder 11.

The invention claimed is:

1. A drive unit for a drive for adjusting an adjusting element of a motor vehicle along a geometric drive axis, wherein the drive unit comprises:
    a dynamic unit comprising a drive motor,
    a pre-assembled cable module comprising a motor circuit board, and
    a drive unit housing for receiving at least the drive motor and the cable module,
    wherein the cable module for fixing the motor circuit board comprises a circuit board holder and a cable module cover, into which one or multiple cables for electrical connection to the drive motor and/or the motor circuit board are routed, and a first drive connection, which is connected to the cable module cover, and a geometric cable module axis, wherein the dynamic unit is connected to the cable module in an axially fixed manner,
    wherein, the pre-assembled cable module is configured to be brought together with the dynamic unit by an assembly movement during assembly of the drive unit, and
    wherein by the assembly movement the cable module is configured to be brought from an assembly state, in which the cable module cover is connected to the circuit board holder in an axially fixed manner, into a decoupling state, in which the cable module cover is decoupled from the circuit board holder.

2. The drive unit as claimed in claim 1, wherein during the assembly of the drive unit, in addition to the decoupling between the cable module cover and the circuit board holder, the assembly movement electrically connects the drive motor to the motor circuit board and/or to one or multiple cables.

3. The drive unit as claimed in claim 2, wherein the electrical connection of the drive motor to the motor circuit board and/or to one or multiple cables overlaps in time with the decoupling between the cable module cover and the circuit board holder.

4. The drive unit as claimed in claim 2, wherein the assembly movement in a first section of the assembly movement electrically connects the drive motor to the motor circuit board and/or to the one or the multiple cables and wherein decoupling between the cable module cover and the circuit board holder takes place in a second section of the assembly movement following the first section.

5. The drive unit as claimed in claim 4, wherein the force to be applied to perform the assembly movement during the first section is less than during or at the beginning of the second section of the assembly movement.

6. The drive unit as claimed in claim 1, wherein the cable module cover is connected to the drive unit housing in an axially fixed and rotationally fixed manner in the assembled state of the drive unit by a force-fit, material-bonded, or form-fit connection, and furthermore
- wherein the cable module cover can be pushed at least in sections axially into the drive unit housing or can be pushed axially onto the drive unit housing, or
- wherein the assembly movement or a section of the assembly movement comprises a radial and/or a tangential component in addition to an axial component.

7. The drive unit as claimed in claim 1, wherein the cable module comprises at least one electrical connection plug, which is electrically connected to at least one cable of the cable module, and wherein the bringing together of the cable module cover with the dynamic unit brings about an electrical connection between the electrical connection plug and a corresponding connection part of the drive motor.

8. The drive unit as claimed in claim 1, wherein the circuit board holder lies against the drive motor in one axial direction and against the cable module cover in the other axial direction via a damping element in the assembled state of the drive unit.

9. The drive unit as claimed in claim 1, wherein the cable module cover is configured to be brought together with the circuit board holder during pre-assembly of the cable module and can be connected in an axially fixed and rotationally fixed manner.

10. The drive unit as claimed in claim 1, wherein in the assembly state the cable module cover and the circuit board holder are designed in one piece with each other.

11. The drive unit as claimed in claim 10, wherein the cable module cover and the circuit board holder are separated at the predetermined breaking point in the decoupling state.

12. The drive unit as claimed in claim 1, wherein the force to be applied to perform the assembly movement is 30 N to 200 N.

13. The drive unit as claimed in claim 1, wherein the circuit board holder comprises a fixing element for fixing the one or multiple cables relative to the circuit board holder, wherein the fixing element is configured to provide strain relief of the one or multiple cables.

14. A drive for adjusting an adjusting element of a motor vehicle, wherein the drive comprises the drive unit as claimed in claim 1, wherein the drive comprises a feed gear coupled to the drive unit, for generating drive movements along a geometric drive axis between a first drive connection and a second drive connection.

15. The drive unit as claimed in claim 1, wherein the force to be applied to perform the assembly movement is 70 N to 100 N.

* * * * *